United States Patent [19]

Kerres

[11] 4,270,464
[45] Jun. 2, 1981

[54] SMOKE GENERATOR FOR SMOKING FOOD PRODUCTS

[76] Inventor: Siegfried Kerres, Im Lerchenderg, D 7057, Winndnden-5, Fed. Rep. of Germany

[21] Appl. No.: 6,875

[22] Filed: Jan. 25, 1979

[51] Int. Cl.³ .............................................. F23K 3/00
[52] U.S. Cl. ................................. 110/102; 99/482; 110/118; 126/59.5; 426/314
[58] Field of Search ............... 110/102, 115, 116, 118, 110/276, 293; 222/486; 126/59.5; 99/467, 482; 426/314

[56] References Cited

U.S. PATENT DOCUMENTS

| | | | |
|---|---|---|---|
| 1,174,088 | 3/1916 | Mulock | 110/118 |
| 1,667,703 | 4/1928 | Simon | 110/118 |
| 1,703,467 | 2/1929 | Allen | 222/486 X |
| 2,128,125 | 8/1938 | Dukas | 110/118 |
| 2,515,455 | 7/1950 | Lipton | 110/118 X |
| 3,166,219 | 1/1965 | Rudd | 222/486 X |
| 3,809,056 | 5/1974 | Snelling | 126/59.5 |
| 4,096,808 | 6/1978 | Trickel | 110/102 X |

Primary Examiner—Edward G. Favors
Attorney, Agent, or Firm—Mortenson & Uebler

[57] ABSTRACT

A smoke generator and method for smoking food products such as meat, sausage and fish are provided. Smoke is produced from glowing sawdust maintained at a temperature just below the flame point in the presence of excess oxygen. The smoke produced is low in tar and carbon and the food product produced possesses outstanding smell and taste and has excellent uniformity of color.

3 Claims, 5 Drawing Figures

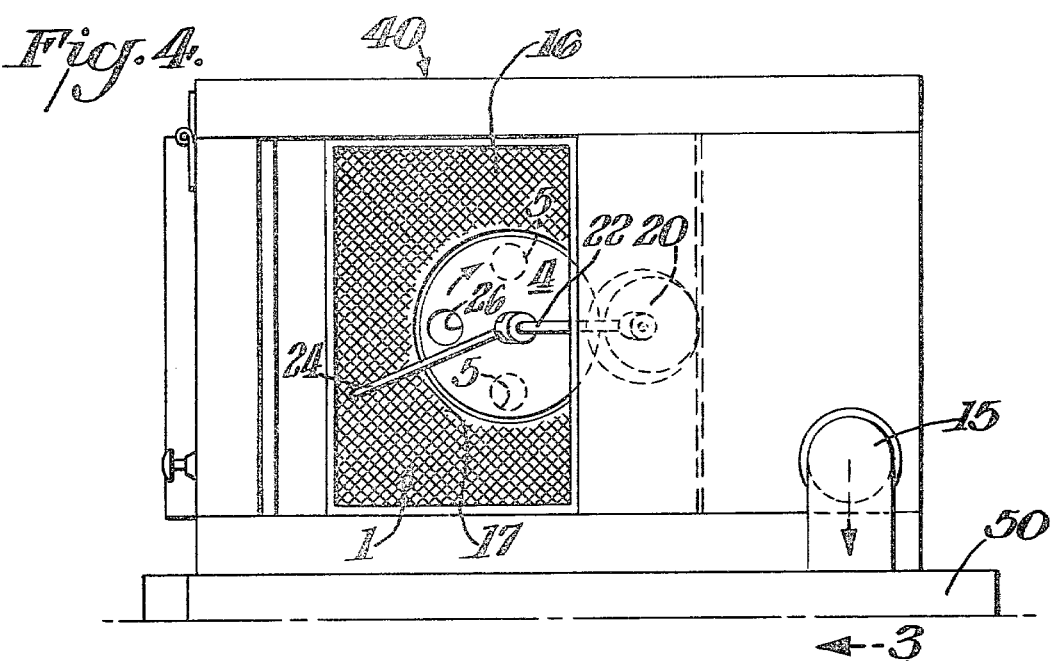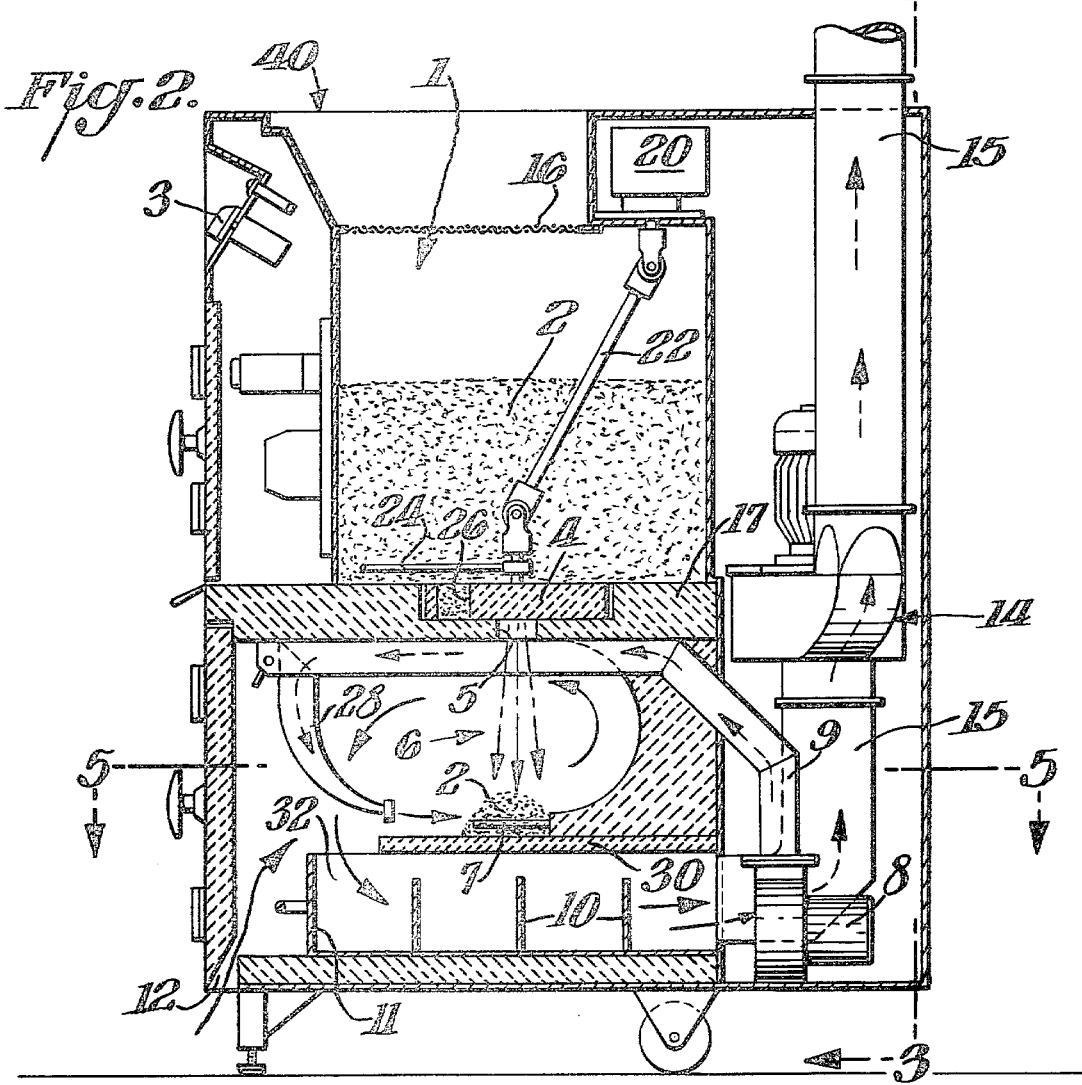

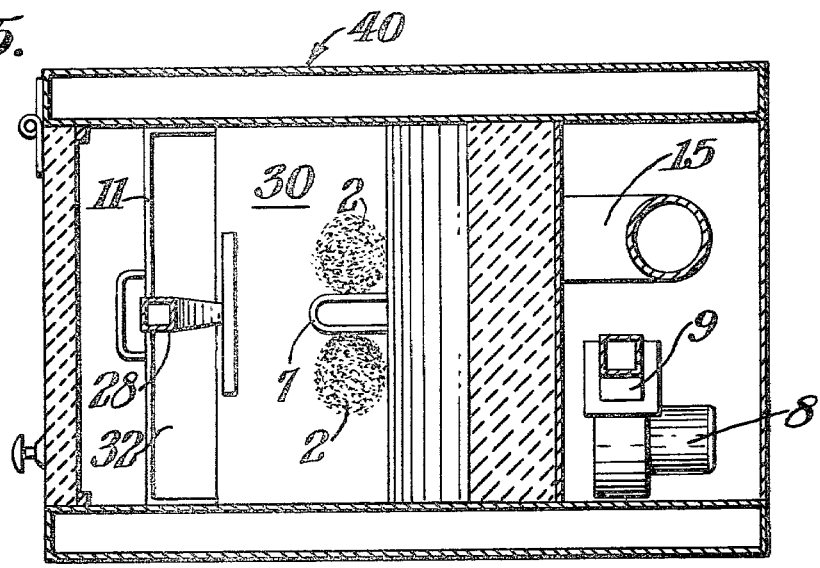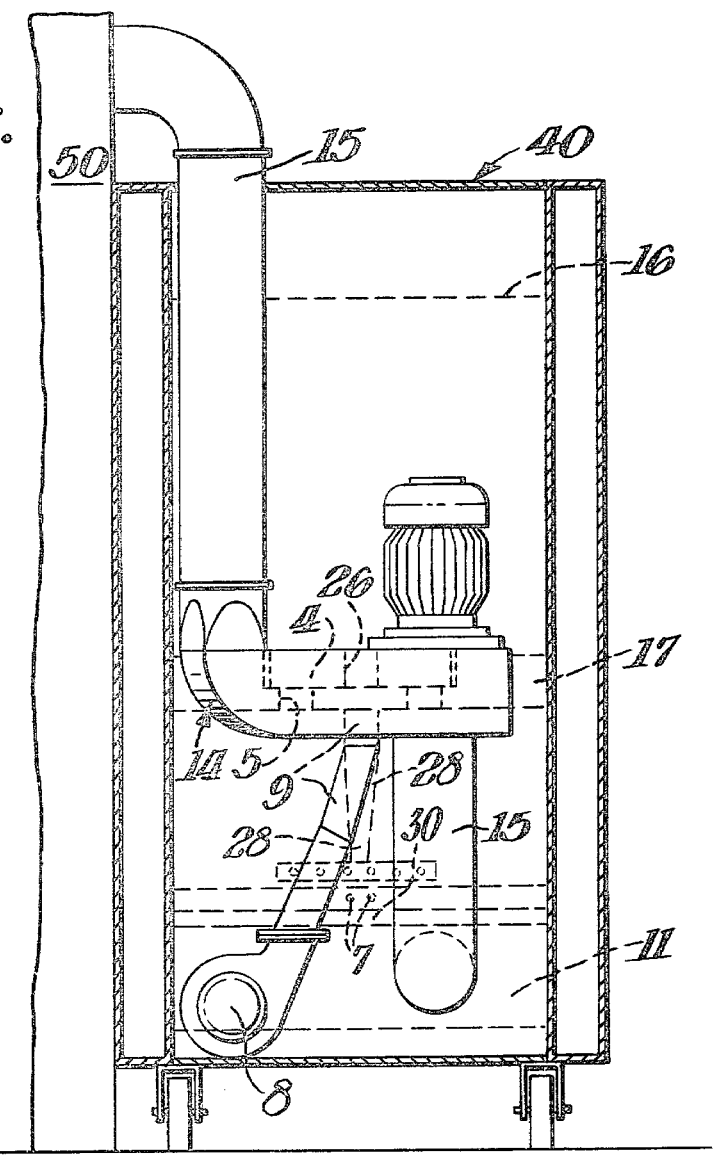

4,270,464

SMOKE GENERATOR FOR SMOKING FOOD PRODUCTS

BACKGROUND OF THE INVENTION

Meat and other foodstuffs have been smoked in order to enhance their flavor for centuries. Presently, the process for smoking meat, sausage, fish and other foods which is used virtually worldwide is one in which smoke is generated from smoldering sawdust in the presence of a reduced amount of oxygen (air). This conventional procedure produces heavy, concentrated smoke. In order to achieve enhanced taste and esthetically pleasing appearance and color of the smoked product by the conventional techniques, a period of time of drying the product prior to smoking is generally required. Then, smoking is carried out under conditions of added and controlled humidity, in order to get the smoke into the previously dried product and provide a product having acceptable color and appearance. If the prior drying of the product is not carried out, then in the smoking of the product by the conventional method, it can be difficult to produce uniform color and the product can easily be oversmoked, resulting in excessive and undesirable smell and taste of smoke in the product.

BRIEF DESCRIPTION OF THE DRAWINGS

In the accompanying drawings,

FIG. 2 shows a cross-sectional side elevational view of the smoke generator taken through FIG. 1 substantially along line 2—2 thereof.

FIG. 3 is a cross-sectional rear elevational view of the smoke generator taken through FIG. 2 substantially along line 3—3 thereof.

FIG. 4 is a top plan view of the smoke generator.

FIG. 5 is a cross-sectional top plan view of the smoke generator taken through FIG. 2 substantially along line 5—5 thereof.

SUMMARY OF THE INVENTION

Figure 1:
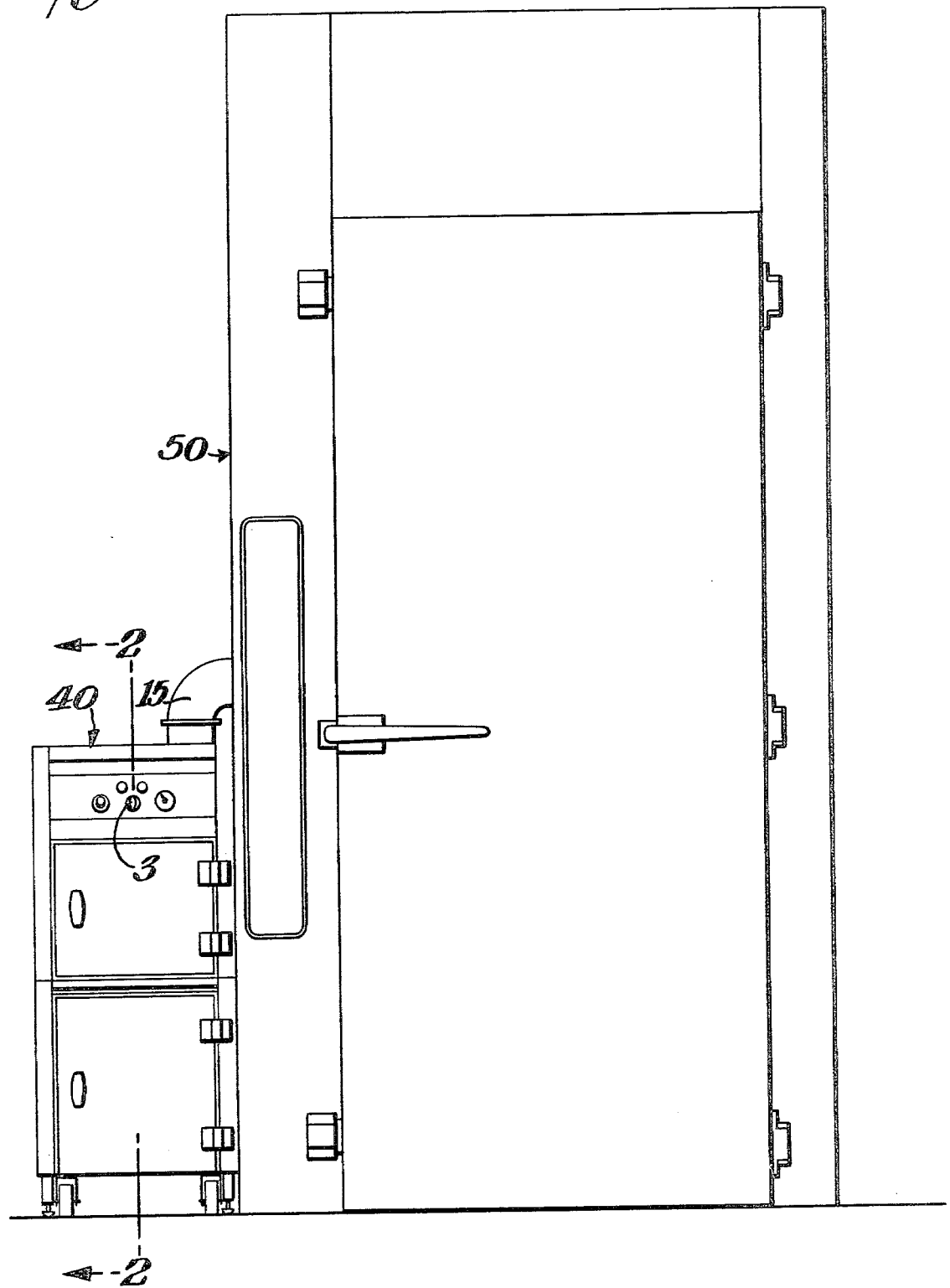
FIG. 1 shows a front elevational view of the smoke generator of this invention and a smokehouse for curing meat, sausage, fish and similar food products.

Apparatus is provided for continuously generating smoke for use in smoking food products, which apparatus comprises:

a housing containing a chamber for holding sawdust and a chamber in which smoke is generated, and means for continuously feeding sawdust at a desired rate from the sawdust chamber into the smoke generating chamber, and heating means within the smoke generating chamber to ignite the sawdust fed thereinto, and means for supplying fresh air into the smoke generating chamber, and duct means for exhausting the smoke produced in the smoke generating chamber from the chamber and for feeding the smoke to a smokehouse, thereby providing apparatus for continuously smoking food products.

In a preferred embodiment of the apparatus, the sawdust holding chamber is located above the smoke generating chamber, the two chambers being separated by a barrier, this barrier having an opening in it extending from the top of the smoke generating chamber into the barrier to a circular cylindrical cavity in the barrier, which cavity extends to the bottom of the sawdust holding chamber, the circular cavity having placed in it a circular, cylindrical rotatable disc having at least one vertical opening therethrough located in said disc such that upon each rotation of the disc, the openings in the barrier and the disc become aligned with each other at one instant in the rotation, thereby permitting a portion of the sawdust in the sawdust chamber to pass into the smoke generating chamber, and means are provided for rotating the disc at a predetermined, desired rotational speed, thereby providing apparatus for continuously feeding sawdust into the smoke generating chamber at a desired feed rate.

The apparatus may include additional draft means into the smoke generating chamber to permit inflow of additional fresh air to be admixed with the smoke generated.

Also provided is a method of smoking food products such as meat, sausage, fish and the like, comprising continuously supplying sawdust feed to a smoke generating chamber, igniting the sawdust, continuously supplying an excess of air to the ignited sawdust sufficient to maintain the ignited sawdust glowing but below the flame point, thereby continuously generating oxygen enriched smoke, and curing food products with the smoke generated.

DETAILED DESCRIPTION OF THE INVENTION WITH REFERENCE TO THE DRAWINGS

The smoke generator of this invention can best be described with reference to the accompanying drawings.

FIG. 1 shows the smoke generator housing 40 and smokehouse 50 in front elevation. Duct 15 carries the smoke generated by the smoke generator of this invention into the smokehouse 50.

FIG. 2 is a side cross-sectional view of the smoke generator of this invention, taken substantially along line 2—2 of FIG. 1. Housing 40, preferably made of stainless steel, houses a chamber 1 for holding sawdust and a chamber 6 wherein smoke is generated, together with the required accessory equipment.

Sawdust or wood choppings or the like is fed into the sawdust holding chamber 1 through screen 16. Screen 16 is preferably of stainless steel and has approximately 0.625 to 0.940 cm (0.25 to 0.375 in.) openings. The sawdust within the holding chamber is designated 2.

Barrier 17 separates the sawdust holding chamber 1 from the smoke generating chamber 6. Rotatable, cylindrical disc 4 having at least one opening 26 therethrough is located in the circular cylindrical cavity in barrier 17 as shown, immediately above opening 5, which extends through the barrier 17 and into the smoke generating chamber 6.

Means for rotating disc 4 are provided. The disc rotation is driven by motor 20 through universal assembly 22 connecting the motor drive 20 to the disc 4. Rod 24 acts as an agitating device to prevent excessive compaction of the sawdust.

Switch 3 is turned on and disc 4 rotates at a desired speed, switch 3 being connected electrically through relays and other circuitry (not shown) to power motor 20. As disc 4 rotates, the hole or holes 26 in the disc 4 align with opening 5 into the smoke generating chamber 6 at one point during the rotation. When hole or holes 26 pass over opening 5, a portion of the sawdust 2 passes through these openings into the smoke generating chamber 6 and is deposited onto ash box cover 30 directly below opening 5. To produce more or less sawdust feed, and thus more or less smoke generation, the speed of rotation of disc 4 is either increased or decreased, respectively. Opening 5 is shown in FIG. 2 for clarity, but one skilled in the art will realize that opening 5 is not actually cut by section line 2—2. See FIG. 4.

Heating element 7, located below opening 5 and just above cover 30 becomes surrounded by the sawdust fed to cover 30. The heating element 7 initially ignites the sawdust 2 and the sawdust begins to glow. After a preadjusted ignition time of approximately 3 to 10 minutes, air blower or ventilator 8 is started and continuously thereafter blows fresh air into smoke generating chamber 6 through duct 9 and nozzle 28 against the glowing sawdust 2.

Thereafter, heating element 7 may be operated in preadjusted intervals or it may be shut off, because the continuous flow of air through duct 9 and nozzle 28 keeps the continuously fed sawdust ignited and glowing. The rate of feed of sawdust and the rate of feed of air must be adjusted so as to maintain the sawdust glowing, but not flaming. Different types of sawdust may require different feed rates. The critical requirement is that the smoke be produced from glowing and not flaming sawdust. The smoke produced in this way is moisture free and contains few tars and carbon products.

The continuous glow of the sawdust in the smoke generator of this invention, activated by the fresh air taken from outside the generator, produces a light smoke which, when used in smoking food products, produces a product outstanding in taste and aroma, having a pleasing shiny smoke color.

The smoke thus produced passes through opening 32 in ash box 11, in which residual ash and dust are retained. Ash box 11 is shown having baffles 10 and cover 30. Cover 30 covers the ash box as shown and receives the sawdust thereon as shown. Cover 30 does not completely cover the ash box, the opening 32 being required to convey the smoke out of the smoke generating chamber. Ash box 11 may be removed from the chamber through door 13 for cleaning when necessary.

An additional draft means 12 is shown located under door 13 through which additional fresh air is sucked into smoke generating chamber 6 and admixed with the smoke. This oxygen rich smoke is then transported through opening 32 by means of exhaust ventilator 14 through ductwork 15 and is conveyed to adjoining smokehouse 50.

The arrows shown in FIG. 2 indicate the general direction of air flow in duct 9, air flow through draft means 12, smoke and air flow in chamber 6 and thence exhausting through ductwork 15 into smokehouse 50.

FIG. 3, in cross section, shows a rear elevational view of the smoke generator of this invention. FIG. 3 indicates the general positioning of the means for feeding fresh air into the smoke chamber and the ductwork and ventilation means for carrying the smoke generated into the adjoining smokehouse. Therein, air blower 8 blows fresh air into duct 9 and nozzle 28. From nozzle 28, the air impinges on the sawdust which accumulates on ash box cover 30 around heating element 7. The smoke generated circulates in the chamber and flows into ash box 11 through opening 32 (not shown), thence through ductwork 15 by means of exhaust ventilator 14 and into smokehouse 50. Also indicated FIG. 3 for purposes of clarity are the housing of the smoke generator 40, the screen 16, the barrier 17 between the sawdust holding chamber and the smoke generating chamber, and the rotatable disc 4.

FIG. 4 shows a top plan view of the smoke generator of this invention. Therein is shown housing 40 and top screen 16 through which sawdust is fed into sawdust holding chamber 1. Motor drive 20 rotates disc 4 as shown by the arrow through universal mechanism 22. Two openings 26 are shown in disc 4, in circumferential alignment with opening 5 in barrier 17. It can be seen that when disc 4 rotates such that one of the openings 26 is in alignment with opening 5, a portion of the sawdust in the upper holding chamber will be permitted to pass through the openings 26 and 5 and pass into the smoke generating chamber below. Also shown in FIG. 4 are agitating rod 24, exhaust duct 15 and smokehouse 50.

FIG. 5 shows, in cross section, a top plan view of the smoke generator of this invention taken through FIG. 2 substantially along line 5—5 thereof. FIG. 5 indicates housing 40 containing ash box 11, blower motor 8 and associated duct 9, and duct 15. Ash box cover 30 receives sawdust 2 and the sawdust accumulates thereon around heating element 7. Nozzle 28 directs the fresh air to the sawdust 2 and maintains it glowing. The smoke which is generated circulates in the smoke generating chamber and passes through opening 32 into and through ashbox 11 and thence exhausts through duct 15 and is transported into the smokehouse.

The smoke generator of this invention, wherein sawdust is kept in a glowing but not flaming condition to generate smoke for curing food products, produces an oxygen enriched smoke containing a low amount of carbonaceous residue. Advantages of this apparatus and method include great simplification over conventional smoking methods, i.e. a product can be smoked immediately after bringing it into the smokehouse, and predrying and controlled humidity are unnecessary. Also, the system and method possess advantages in reduced air pollution. The amount of carbon residue in the smoke generated is generally in the range of about 0.0002 ounces per cubic foot, and additional energy or after burning means are not generally necessary to reduce the amount of carbon exhausted into the air to acceptable environmental control levels.

Most importantly, the uniformity of color, and the smell and taste of the food product smoked according to this invention is outstanding.

Many of the features and combinations herein described and illustrated represent substantial advances in the art of smoking food products, and they are deemed to be significant elements of the present invention. It is to be understood that the features and combinations involved in the appended claims are to be taken as including all proper alternatives and equivalents within the broadest possible scope of each claim as construed in the light of the prior art.

I claim:

1. Apparatus for continuously generating smoke for use in smoking food products, which apparatus comprises:

a housing containing a chamber for holding sawdust and a chamber in which smoke is generated, and means for continuously feeding dry sawdust at a desired rate from said sawdust chamber into said smoke generating chamber, and heating means within said smoke generating chamber to ignite the dry sawdust fed thereinto, and means for supplying excess fresh air into said smoke generating chamber to the dry sawdust sufficient to maintain said dry sawdust glowing at a temperature just below the flame point, and duct means for exhausting the smoke produced in said smoke generating chamber from said chamber and for feeding the smoke to a smokehouse, thereby providing apparatus for continuously smoking food products.

2. Apparatus in accordance with claim 1 wherein said sawdust holding chamber is located above said smoke generating chamber, the two chambers being separated by a barrier, said barrier having an opening in it extending from the top of the smoke generating chamber into said barrier to a circular cylindrical cavity in the barrier, which cavity extends to the bottom of the sawdust holding chamber, the circular cavity having placed in it a circular, cylindrical rotatable disc having at least one vertical opening therethrough located in said disc such that upon each rotation of said disc, the openings in said barrier and said disc become aligned with each other at one instant in the rotation, thereby permitting a portion of the sawdust in the sawdust chamber to pass into the smoke generating chamber, and means for rotating said disc at a predetermined, desired rotational speed, thereby providing apparatus for continuously feeding sawdust into the smoke generating chamber at a desired feed rate.

3. The apparatus of claim 1 including additional draft means into said smoke generating chamber to permit inflow of additional fresh air to be admixed with the smoke generated.

* * * * *